United States Patent [19]
Gambino et al.

[11] Patent Number: 5,534,360
[45] Date of Patent: Jul. 9, 1996

[54] AMORPHOUS URANIUM ALLOY AND USE THEREOF

[75] Inventors: Richard J. Gambino, Yorktown Heights, N.Y.; Michael W. McElfresh, West Lafayette, Ind.; Thomas R. McGuire, Yorktown Heights; Thomas S. Plaskett, Katonah, both of N.Y.

[73] Assignee: International Business Machines Corporation, Armonk, N.Y.

[21] Appl. No.: 264,238

[22] Filed: Jun. 22, 1994

Related U.S. Application Data

[63] Continuation of Ser. No. 781,196, filed as PCT/US90/02009, Apr. 13, 1990 published as WO91/16470, Oct. 31, 1991, abandoned.

[51] Int. Cl.⁶ .................................................. G11B 5/66
[52] U.S. Cl. .............................. 428/694 ML; 428/692; 428/694 MT; 428/694 RE; 428/694 SC; 428/900; 420/1; 420/3; 420/576; 369/13; 369/14; 365/122; 360/114
[58] Field of Search .................................. 420/1, 3, 576; 428/692, 694 SC, 900, 694 MT, 694 RE, 694 ML; 369/13, 14; 365/122; 360/114

[56] References Cited

U.S. PATENT DOCUMENTS

| | | | |
|---|---|---|---|
| 2,574,626 | 11/1951 | Daane et al. | 420/3 |
| 3,530,441 | 9/1970 | Ovshinsky | 365/113 |
| 3,624,622 | 11/1971 | DiChen | 365/122 |
| 3,750,117 | 7/1973 | Chen et al. | 365/113 |
| 3,949,387 | 4/1976 | Chaudhari et al. | 365/122 |
| 3,965,463 | 6/1976 | Chaudhari et al. | 365/34 |
| 4,464,437 | 8/1984 | Wille et al. | 428/458 |
| 4,907,047 | 3/1990 | Kato et al. | 257/297 |
| 4,925,742 | 5/1990 | Sugawara et al. | 428/692 |

FOREIGN PATENT DOCUMENTS

| | | |
|---|---|---|
| 9031848 | 8/1982 | Japan . |
| 61-12404 | 9/1986 | Japan . |

OTHER PUBLICATIONS

Schoenes et al, "Optical and Magneto–optical Spectroscopy in VCuAs₂ and VCu₂P₂"; *J. Magn. Magn. Mat.* 81 (1989) pp. 112–120.

Reim, "Magneto–optical Verr–effect of Uranium Compounds: A Study of the Electronic Structure"; *J. Magn. Magn. Mat.* 58 (1986) pp. 1–47.

Reim et al., Magneto–optics and electronic structure of uranium monochalcogenides, J. App. Phys. 55(5) 15 Mar. 1984, pp. 1853–1855.

Gambino, et al., New Magneto–Optic Materials, IBM Technical Disclosure Bulletin, vol. 28, No. 6 (1985), pp. 2607–2608.

Laff, et al., Personalization of Amorphous, Thin–Film, Bubble Domain Materials, IBM Technical Disclosure Bulletin, vol. 16, No. 10 (1974), pp. 3427–3428.

Freitas, et al., Magnetic and Transport Properties of a–$U_xGd_{1-x}$ Films, Journal De Physique, (1988), pp. 1357–1358.

Freitas, et al., Transport Properties in Amorphous $U_x-T_{1-x}$ Films (T=Fe, Ni, Gd, Tb, and Yb) (invited), J. Appl. Phys., vol. 64 (1988), pp. 5453–5458.

Freitas, et al., Large Anisotropic Magnetoresistance in a New Class of Amorphous Ferromagnets: U–Sb–Mn, 34th Annual Conference on Magnetism and Magnetic Materials (1989).

Fumagalli, et al., Magneto–Optical and Magnetic Study of Amorphous U–As, U–As–Cu, and U–As–Ti Films, Physical Review B, vol. 46 (1992), pp. 6187–6194.

(List continued on next page.)

*Primary Examiner*—Leszek Kiliman
*Attorney, Agent, or Firm*—Pollock, Vande Sande & Priddy

[57] ABSTRACT

An amorphous alloy containing uranium and a member selected from the group of N, P, As, Sb, Bi, S, Se, Te, Po and mixtures thereof; and use thereof for storage medium, light modulator or optical isolator.

24 Claims, 7 Drawing Sheets

OTHER PUBLICATIONS

Freitas, et al., Random–Anistropy Ferromagnetism in Amorphous $U_{27}FE_{73}$ Films, J. App. Phy. vol. 63 (1988), pp. 3746–3748.

Schneider, Amorphous GdCoCr Films for Bubble Doman Applications, IBM J. Res. Development (1975), pp. 587–590.

Poon, et al., Glassy to Icosahedral Phase Transformation in Pd–U–Si Alloys, Physical Review Letters, vol. 55 (1985), pp. 2324–2327.

Shen, et al., Crystallization of Icosahedral Phase from Glassy Pd–U–Si Alloys, Physical Review B, vol. 34 (1986), pp. 3516–3519.

McElfresh, et al., Observation of Large Magneto–Optical Effects in Amorphous $U_x SB_{1-x}$ Films, Appl. Phys. Lett. vol. 57 (1990), pp. 730–732.

Freitas, et al., Magnetoresistance Anisotropy and Magnetization Reversal Processes in Two Different Kinds of Amorphous Ferromagnets, IEEE Transactions on Magnetics, vol. 26 (1990), pp. 1491–1493.

Freitas, et al., Large Magnetoresistance Anistropy In a New Class of Amorphous Ferromagnets, J. App. Phy. vol. 67 (1990), pp. 4901–4903.

McGuire, et al., Magnetic, Transport and Magneto–Optical Properties of $U_x Sb_{1-x}$ Amorphous Films, IEEE Transactions of Magnetics, vol. 26 (1990), pp. 1349–1351.

Freitas, et al., Giant Anisotropic Magnetoresistance and Excess Resistivity in Amorphous $U_{1-x}Sb_x$ Ferromagnets, The American Physical Society, vol. 64 (1990), pp. 2184–2187.

Gambino, et al., Giant Magneto–Optic Rotation in Amorphous Uranium Antimonide (invited), J. Appl. Phy., vol. 69 (1991), pp. 4750–4754.

Plaskett, et al., Magnetic and Magnetotransport of Amorphous U–As Films, J. Appl. Phys., vol. 70 (1991), pp. 5855–5857.

Fumagalli, et al., Magneto–Optical and Magnetic Study of Amorphous U–As, U–As, –Cu, and U–As–Ti Films, The American Physical Society, vol. 46 (1992), pp. 6187–6194.

Fumagalli, et al., Infrared Kerr Rotation and Magnetic Properties of Amorphous U–Sb Films, IEEE Transactions on Magnetics, vol. 28 (1992), pp. 2970–2972.

Wong, et al., Transport and Magnetic Properties of Icosanedral and Glassy Pd–Up–Si Alloys, Physical Review B, vol. 34 (1986), pp. 7371–7373.

Dillon, et al., Magneto–Optical Study of Uranium Additions to Amorphous $Tb_x Fe_{1-x}$, J. Appl. Phys., vol. 61 (1987), pp. 1103–1107.

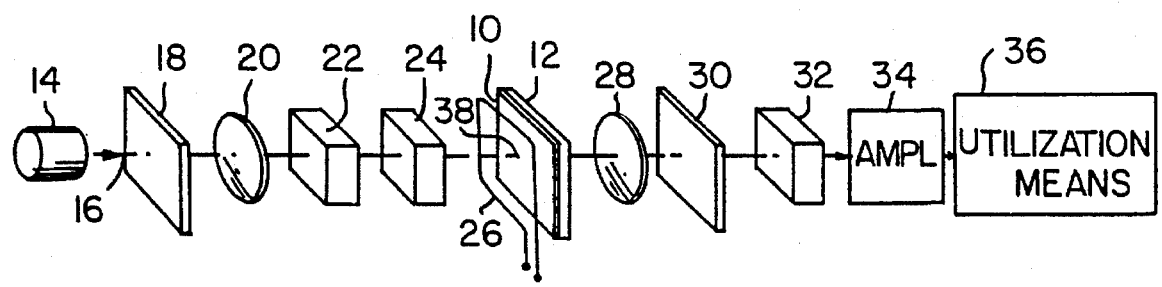
FIG. 1
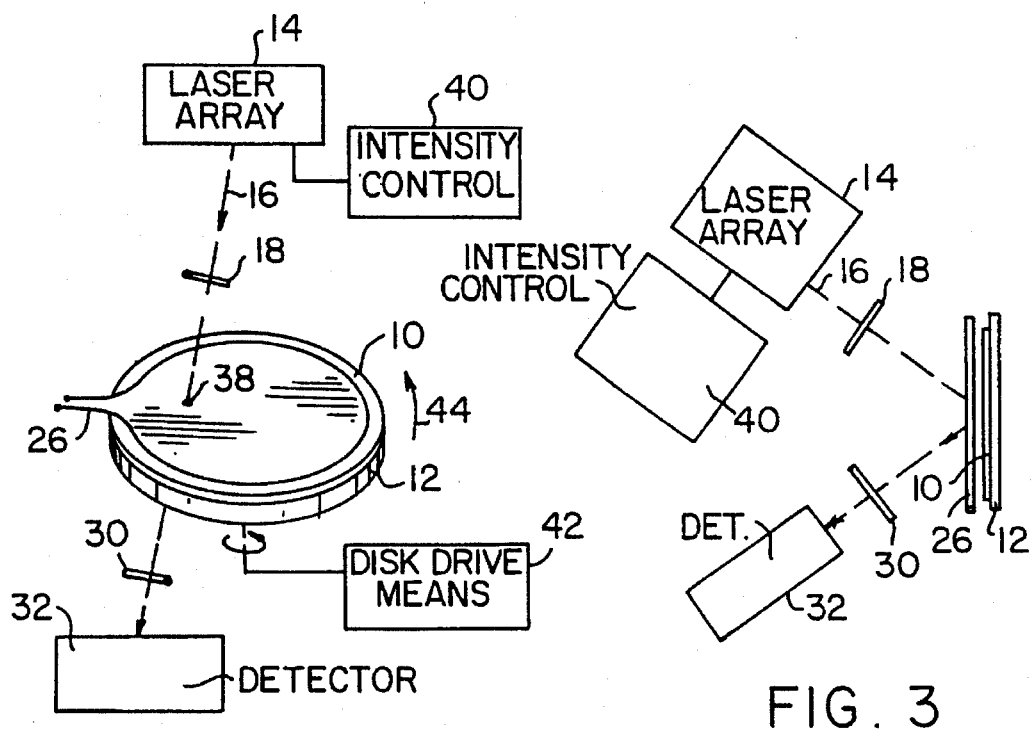
FIG. 2
FIG. 3

FIG. 6
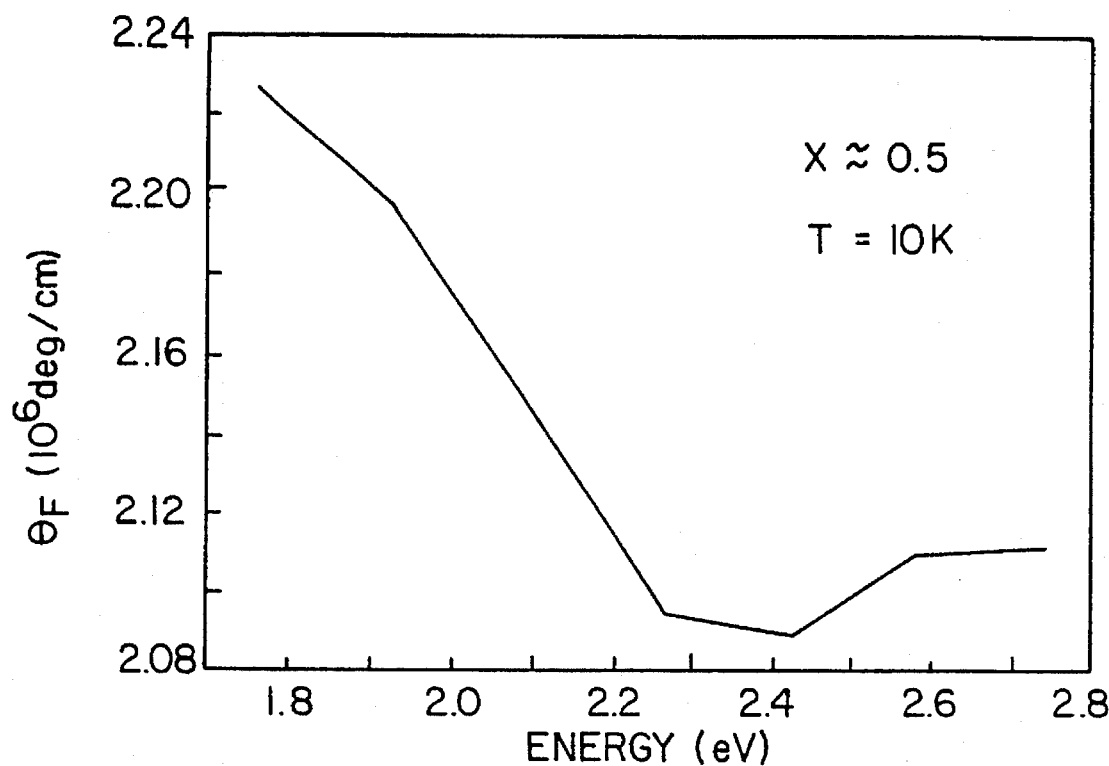
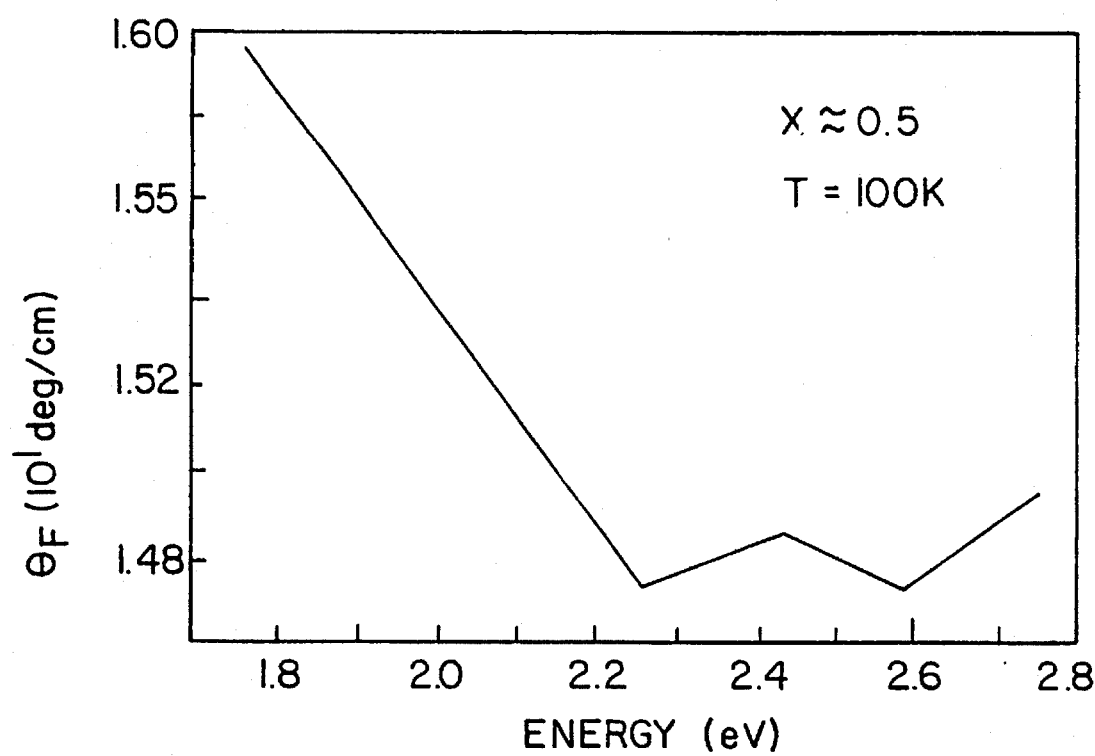
FIG. 7

AMORPHOUS URANIUM ALLOY AND USE THEREOF

This application is a continuation of Ser. No. 07/781,196, filed as PCT/US90/02009, Apr. 13, 1991 published as WO91/16470, Oct. 13, 1991, now abandoned.

TECHNICAL FIELD

The present invention is concerned with amorphous uranium alloys that exhibit enhanced magneto-optical characteristics. In addition, the present invention is concerned with the use of such amorphous uranium alloys for such purposes as storage medium, light modulator or optical isolator. In particular, the amorphous uranium alloys of the present invention contain at least one of N, P, As, Sb, Bi, S, Se, Te, Po. The amorphous alloys of the present invention are especially suitable as magnetic storage medium for beam addressable files.

BACKGROUND ART

Beam addressable file using thin magnetic films of insulators are known in the art. For instance, materials such as gadolinium iron garnets have been used. Also, metals such as MnBi have been used as the storage medium in beam addressable files. General descriptions of these file systems can be found in the following:

1. A. H. Eschenfelder, J. APPL. PHYS., 41, 1372 (1970).
2. J. A. Rajchman, J. APPL. PHYS., 41, 1376 (1970).
3. R. E. McDonald et al., J. APPL. PHYS., 40, 1429 (1969).
4. D. Chen et al., J. APPL. PHYS., 39, 3916 (1968).

In addition to these materials, stoichiometric MnAlGe has been suggested as a suitable material in a magneto-optic environment. This is a polycrystalline film.

Some non-magnetic amorphous materials have been used in beam addressable file environments, as can be seen by referring to U.S. Pat. No. 3,530,441. These amorphous materials are "ovonic-type" materials which do not exhibit magnetic properties. They undergo structural changes when being switched in the beam addressable environment in contrast with the switching which occurs in a magnetic film. Because structural changes (transitions between an amorphous and a crystalline state) are much more destructive on the film itself, magnetic films can be switched many more times than non-magnetic amorphous films in this type of environment.

Amorphous films have an advantage in that they can be placed on any type of substrate and can be adjusted to provide wide composition ranges. Additionally, the requirements relating to polycrystalline grain size which are present with crystalline beam addressable storage material are not present.

More recently, amorphous materials suitable as magnetic medium such as in beam addressable file environments have been disclosed in U.S. Pat. Nos. 3,949,387 and 3,965,463 to Chaudhari, et al. and assigned to International Business Machines Corporation, the assignee of the present application, disclosures of which being incorporated herein by reference.

However, although the amorphous materials disclosed in U.S. Pat. Nos. 3,949,387 and 3,965,463 exhibit magneto-optical properties suitable for their desired use, such materials could stand improvement with respect to certain properties. For instance, increased degree of Faraday rotations would be desirable to facilitate the read out of a file. Other properties needed for a material to be practical as a magnetic medium in a beam addressable system include existence of an atomic magnetic moment, spin orbit coupling, magnetic order, magneto-optic response at the desired wavelength and square loop hysteresis. Accordingly, it is apparent that providing materials capable of satisfying the requirements for beam addressable magnetic storage medium is quite a difficult task.

SUMMARY OF INVENTION

It is an object of the present invention to provide a material suitable as magnetic medium and exhibiting increased magneto-optic rotations (Faraday or magneto-optic Kerr rotation) as compared to prior amorphous magnetic materials. It is a further object of the present invention to provide a material that has magnetic moment, spin orbit coupling, order magnetically, is optically responsive and has a square hysteresis loop.

In particular, the present invention is concerned with an amorphous alloy containing uranium and exhibiting magneto-optical rotation having a Faraday rotation of at least about $0.9 \times 10^6$ deg/cm or having a magneto-optic Kerr rotation of at least about 1 degree.

A further aspect of the present invention is an amorphous uranium alloy exhibiting magneto-optical rotation and containing uranium and at least one of N, P, As, Sb, Bi, S, Se, Te and Po. The atomic ratio of the uranium to the other material is about 85:15 to about 15:85.

Another aspect of the present invention is use of the above disclosed amorphous alloys as magnetic storage medium in a storage system. The storage system includes the storage medium onto which is incident an electromagnetic beam used to write a plurality of bits of information into the storage medium or to read the information associated with the bits stored in the storage film.

Another aspect of the present invention is a magnetic system that includes a magnetic medium containing an amorphous alloy of the type disclosed above along with a writing means for changing the magnetic state of the magnetic medium and a reading means for detecting the magnetic state of the magnetic medium. The writing means includes a beam generating means for directing electromagnetic energy at the magnetic medium and magnetic field producing means for providing a magnetic field in the magnetic medium.

A still further aspect of the present invention is directed to a beam addressable system that includes a magnetic medium containing an amorphous alloy of the type disclosed above. The beam addressable system also includes beam producing means for generating a beam of electromagnetic energy at desired locations of the magnetic medium for heating such. Also the beam addressable system contains magnetic field producing means for providing a magnetic field in the magnetic medium to change its magnetic state at the desired locations. A reading means is also included for detecting a beam of electromagnetic energy after it has struck the magnetic medium at the desired locations in order to determine the magnetic state at the locations.

BRIEF DESCRIPTION OF THE DRAWINGS

FIG. 1 shows a beam addressable file system employing an amorphous magnetic film as the storage medium.

FIG. 2 shows a beam addressable film system in which the amorphous magnetic material is located on a movable disk.

FIG. 3 shows an apparatus for readout of the information stored in the amorphous magnetic film using the Kerr effect.

FIGS. 6 and 7 illustrate energy dependence of specific Faraday rotation ($10^6$ deg/cm).

BEST AND VARIOUS MODES FOR CARRYING OUT INVENTION

Figure 4:
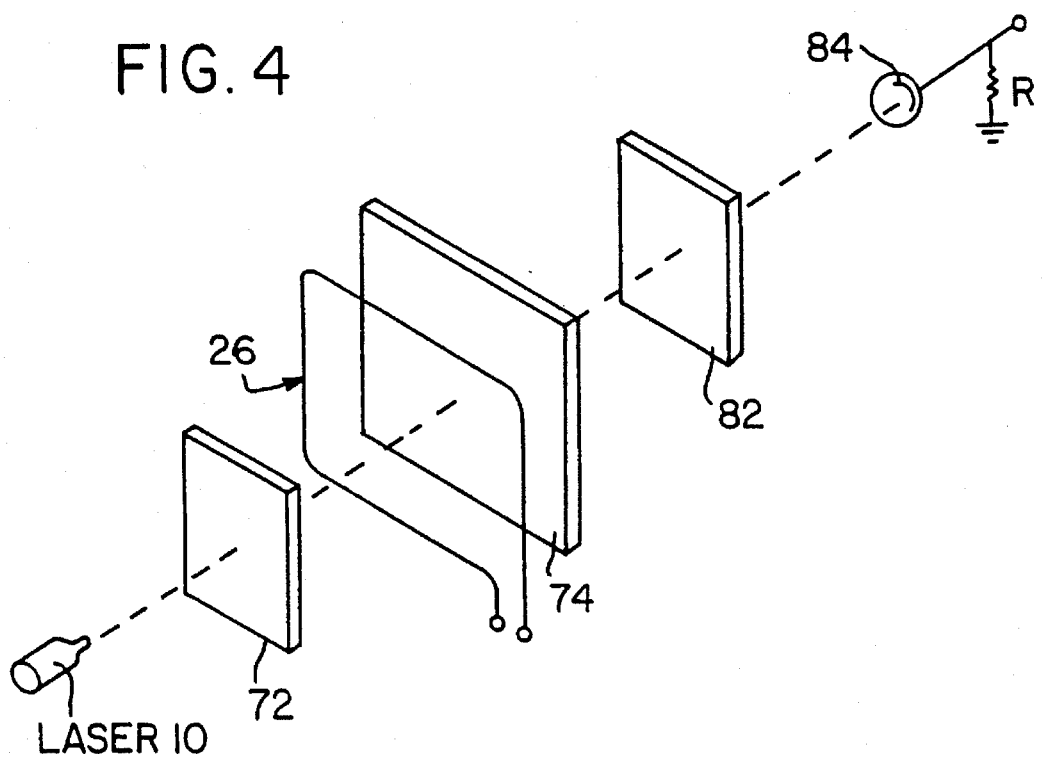
FIG. 4 is a magneto-optic light modulator using the present amorphous magnetic materials as the light modulating medium.

FIG. 1 shows a beam addressable file system in which a film 10 of the amorphous magnetic material is located on a suitable substrate 12. Substrate 12 can be an insulator or a conducting material and can be either transparent or reflecting to input electromagnetic energy. Examples of suitable substrates include glass, spinel, quartz, sapphire, $Al_2O_3$, and metals such as aluminum, and copper. An energy source 14 is provided which is usually a light source. Preferably source 14 is a laser on an array of lasers which produce a monochromatic output beam 16. This invention can utilize any electromagnetic or other energy source which can provide energy of sufficient intensity to heat the amorphous magnetic film 10 to a temperature approximating either its compensation temperature or its Curie point $T_c$. Thus, an electron beam can be used to locally heat portions of film 10 during the write and erase operations.

Associated with electromagnetic source 14 is a polarizer 18 and a focussing lens 20. Polarizer 18 is of a type well known in the art for providing a plane polarized beam.

A light modulator 22 is provided for varying the intensity of light beam 16. This feature is used for reading of information from selected portions of film 10, as will be more apparent later. A light deflector 24 deflects light beam 16 so that it will strike discrete selected portions of film 10. Light deflector 24 can be of a known type, for instance, an electro-optic deflector which deflects beam 16 to selected portions of film 10 in response to application of an electric field to deflector 14. An acoustic deflector is also suitable. Of course, in the case of an electron beam input, magnetic elements or electrostatic deflection elements are used to deflect the electron beam to selected portions of film 10.

Associated with film 10 is a current carrying coil 26 which is used to provide a magnetic field in film 10. This magnetic field is used for writing information into film 10 and will be explained more fully during the discussion of the write, read, and erase operations.

A lens 28 is used to focus the beam 16 which has passed through film 10 and transparent substrate 12. An analyzer 30 selectively passes light beam 16, depending upon the degree of rotation of its polarization vector. Detector 32 is responsive to the intensity of the light beam incident upon it and provides an electrical signal in a manner well known in the art.

For instance, detector 32 can be a photocell, photodiode, or any other light sensitive element which produces an electrical output. Generally, detector 32 is a high frequency responsive photodetector.

The electrical output of detector 32 is amplified by amplifier 34 and applied to a utilization means 36, which can be any other circuit or apparatus responsive to the information state of the beam addressable file system.

The amorphous alloys employed pursuant to the present invention contain uranium and exhibit magneto-optical rotation. Typically, the alloy contains at least one member selected from the group of N, P, As, Sb, Bi, S, Se, Te and Po, and preferably at least one member selected from the group of As, Sb, Bi, Se, Te and Po and most preferably Sb. The atomic ratio of the uranium to the above disclosed materials in the alloy is usually about 15:85 to about 85:15; preferably about 20:80 to about 80:20 and most preferably about 60:40 to about 40:60.

In addition, the amorphous alloy is preferably a binary alloy, but, if desired, can include mixtures of the above defined elements as well as including auxiliary metals, examples of which being manganese and cobalt. When auxiliary metals are present in amounts of about 5 to about 40 atomic percent and preferably about 10 to about 20 atomic percent of the alloy.

Moreover, in place of or in addition to the above alloying metals, other materials can be alloyed with the uranium so long as the desired magneto-optical properties are achieved. It is believed that such characteristics can be obtained when the uranium atoms in the alloy are surrounded by a cluster of atoms of the alloying material(s) to thereby isolate the uranium atoms from one another to thereby achieve a magnetic moment.

According to preferred aspects of the present invention, the amorphous uranium alloy exhibits a Faraday rotation of at least about $0.9 \times 10^6$ degs/cm, more preferably at least about $10^6$ degs/cm and most preferably at least about $2 \times 10^6$ degs/cm. Correspondingly, the Kerr rotation of the amorphous uranium alloys is preferably at least about 1.6 degrees and most preferably at least about 3 degrees.

The Faraday and Kerr rotations achievable by the present invention are quite surprising since prior known amorphous magnetic materials do not have such high rotation. In particular, the largest rotation previously reported in an amorphous alloy is about $0.5 \times 10^6$ deg/cm in some Nd alloys. Moreover, there are only few crystalline materials such as EuS and CeSb that exhibit such high rotations. Although there have been reports of crystalline uranium compounds having large Kerr rotation (e.g.—W. Reim, J. Magn. Magn. Mat. 58, 1 (1986)) such are not of much interest for magnetic storage medium since such have not been available in thin film form (Reim, supra, discussed cleaved single crystals in reflection including USb which has the rock salt structure) and since the single crystal uranium compounds have such large magnetocrystalline anisotropy that they can only be saturated along certain crystal directions in practical fields. This means that a polycrystalline film is not very useful because most of the crystallites are not oriented with their easy magnetic axis in the direction of light propagation. Moreover, since a number of amorphous uranium alloys and particularly amorphous uranium-rare earth or transition metal element alloys are not magnetic, the magneto-optical properties achieved by the alloys of the present invention are quite surprising. In contrast to the alloys of the present invention, combinations such as UCo, UFe, UTb, UYb, UGd, and UNi were studied and found to have nonmagnetic U. The uranium did not have a magnetic moment in these alloys and did not exhibit an enhanced Faraday rotation.

The amorphous uranium alloys of the present invention exhibit magnetization (M) of at least about 100 emu/cm$^3$ and preferably about 170 to about 240 emu/cm$^3$ and most preferably about 175 emu/cm$^3$ to about 190 emu/cm$^3$.

Moreover, the amorphous uranium alloys of the present invention exhibit square loop hysteresis and accordingly remain magnetic after being magnetized having a large magnetic remanence. The square loop characteristic assures for long-term stability.

The amorphous uranium alloys of the present invention exhibit coercivities (Hc) of at least about 5 kOe and preferably about 10 kOe to about 20 kOe. Coercivity in magnetic material is a primary factor in determining the stability of the magnetic domains used to store information in the material.

It is noted that in these materials high coercivity is obtained when the magnetic field is applied either parallel or perpendicular to the surface of the film.

The amorphous uranium alloys of the present invention exhibit Curie temperatures (Tc) of at least about 70° K., and typically about 135° K.

Furthermore, the amorphous uranium alloys of the present invention have Hall angles ($\Theta_H$) of at least about 4 degrees and preferably about 10 to about 17 degrees, typical of which being about 13 degrees.

In addition, the amorphous uranium alloys exhibit relatively large resistivity values ($\rho$) of at least about 200 micro ohm-cm and preferably at about 300 to about 500 micro ohm-cm; and Hall resistivity values ($\rho_H$) of at least about 40 micro ohm-cm and preferably about 80 to about 160 micro ohm-cm.

The amorphous uranium alloys of the present invention are responsive to light and in particular to light in the visible wavelength range.

The amorphous magnetic materials employed pursuant to the present invention can be fabricated in bulk form or preferably as thin films. In general, any known film deposition technique can be utilized including sputtering and evaporation.

To form a bulk form of amorphous magnetic material splat cooling may provide a useful technique. In this method, a hot liquid of the film constituents is incident on a cool surface where the constituents solidify to form an amorphous bulk film. This provides a rapid quenching from the liquid phase.

In a preferred technique, the amorphous films are prepared by magnetron sputtering onto a rotating substrate such as glass. The sputtering is from separate uranium and alloying metal (e.g.—Sb) targets using two magnetron sputtering guns (one for each target) such as available from Sputtered Films under the trade designation Research S-guns. The targets are typically in an argon atmosphere at about 3 milliTorr. The base pressure being at least about $10^{-8}$ Torr and more typically about $7 \times 10^{-8}$ Torr. The argon is introduced at about 30 sccm. The rotating substrate is above the targets so that the sputtering is upwardly and is about 3 to about 4 inches from the gun and at about room temperature. The uranium and alloying material (e.g.—Sb) are deposited sequentially after which a homogenous alloy is formed on the substrate. In a typical example, the rotation of the substrate is about 17 revolutions per minute and depositing about 300 angstroms per minute of uranium and about 500 angstroms per minute of, for instance, antimony. Prior to the deposition, the substrate can be cleaned such as by washing in a typical detergent followed by a deionized water rinse. The amorphous alloys can protect from oxidation by over coating with $SiO_2$, $ZrO_2$, $TiO_2$, $Si_3N_4$, or other transparent coatings.

OPERATION OF THE SYSTEM OF FIG. 1

Information is written into storage film 10 using either Curie point writing or compensation point writing. Readout is achieved using either the Kerr or Faraday effect. Erasure in discrete locations or block erase of the entire sheet 10 is easily obtained.

WRITE OPERATION

The steps required to produce information in selected regions of amorphous magnetic sheet 10 are the same whether Curie point writing or compensation point writing is used. The writing can be readily operated at liquid nitrogen temperatures. This is acceptable for applications such as isolators for laser gyros and media for high performance magneto-optic disks Compensation point is the temperature for a specific composition at which the atomic magnetic moments of opposite polarity of the components of the composition cancel each other out to achieve zero magnetization.

The write operation is as follows for both Curie point writing and compensation point writing:

1. The storage film 10 is initially in a demagnetized state having about equal numbers of magnetic domains with magnetization oppositely directed and perpendicular to the plane of the film. The storage film 10 is then subjected to a saturation magnetic bias field normal to the plane of the film in order to get the magnetization of all domains in one direction. This is easily achieved by passing a current through coil 26.

2. After this, a small magnetic bias field perpendicular to the plane of film 10 but oppositely directed to the saturation magnetic field is applied over the entire film. Again, this small magnetic field is conveniently applied by current through coil 26. If desired, the film can be scanned by a permanent magnet to provide the large saturation bias field.

3. The laser beam 16 is then directed to a selected location of film 10 where it causes localized heating of the film to a temperature above the compensation temperature (compensation point writing) or to a temperature approximating the Curie temperature $T_c$ (Curie point writing). The small magnetic field is still present in the magnetic film 10. When the laser pulse is removed the portion of film 10 on which the laser beam was incident cools in the presence of the small magnetic field and has its magnetization switched to that direction.

In some cases, the small magnetic field may not need to be present while the localized region of the film is cooling if sufficient magnetic closure paths (demagnetization field) exist in film 10 in order to achieve the reverse magnetization.

Both Curie point writing and compensation point writing are used to put localized regions of the film 10 into a reverse magnetization state.

READ OPERATION

Information contained in recorded spots (such as 38) of film 10 is conveniently read using either the magneto-optic Kerr effect or the Faraday effect. For this purpose, the same light beam 16 as was used for writing can be utilized. However, the intensity of the light beam is reduced to approximately 1/10 of its intensity when used for writing so that no appreciable temperature rise occurs when the storage medium 10 is exposed to the incident beam.

During the write operation, modulator 22 allowed beam 16 to proceed unimpeded to film spot 38. This in turn allowed rapid heating of the film to a temperature close to either a Curie point or compensation point. However, during the reading operation modulator 22 lessens the intensity of beam 16 reading spot 38, so that its intensity is approximately 1/10 of its intensity when used for writing.

When reading beam 16 is incident on a recorded spot 38, the plane of polarization of the transmitted light beam is rotated as a function of the orientation of the magnetic vector of the recorded spot. For purposes of this specification, it is assumed that analyzer 30 will pass the light beam when the polarization direction of the beam is rotated in a direction corresponding to an antiparallel magnetic vector alignment and will block the light beam when its polarization is rotated in a direction corresponding to a parallel magnetic vector alignment. Thus, the magnitude of the signal generated by detector 32 is indicative of the magnetization direction of the recorded spot 38 which is being read.

ERASURE

Erasure can be done either locally or over the entire storage medium 10. Local erasure results when discrete portions 38 of film 10 have new information written into these portions. Additionally, localized erasure is achieved when the laser beam 16 hits a localized spot which then cools in the presence of a small magnetic field in the direction of the initially applied saturation magnetic field. Thus, the operation is similar to a writing operation except that the small magnetic field insures that the localized spot returns to (or stays in) its initial direction of magnetization.

Block erasure is provided by providing a large magnetic bias field in the original saturation direction. The laser beam 16 is not required for block erasure.

FIG. 2

FIG. 2 shows an embodiment of a beam addressable file in which the storage film 10 is located on a disk-shaped substrate 12. For ease of explanation, the same reference numerals will be used whenever possible. A laser array 14, or an individual laser is used to provide a light beam 16 for writing and reading information into selected portions 38 of amorphous magnetic film 10. As was shown in FIG. 1, a polarizer 18 produces a plane polarized beam of light while an analyzer 30 is used during the reading operation to either pass or block light of selected polarizations. Detector 32 is responsive to the light which strikes it and is used to provide an electrical signal of the information state of selected portion 38.

Associated with laser array 14 is an intensity control circuit 40, which is used to modulate the intensity of laser beam 16 or used in the writing and reading operation. Intensity control 40 can be, for instance, a circuit which reduces the bias current to injection lasers in the array, or a modulator which is located within the laser cavity itself.

Disk drive means 42 is used to rotate the disk comprising film 10 and substrate 12 in the direction of arrow 44. Thus, selected portions of the film 10 are addressed using a stationary laser or array of lasers to provide input beam 16. As was the case previously, source 14 can be another source of electromagnetic energy, such as an electron beam. Regardless of the writing source, a light source would generally be used for purposes of readout.

Operation of the embodiment of FIG. 2 is identical to that of FIG. 1, and will not be described further.

FIG. 3

FIG. 3 shows an embodiment for writing information into storage film 10 and for reading information from selected portions of this film using the Kerr effect, rather than the Faraday effect which has been illustrated with respect to the embodiments of FIGS. 1 and 2. In this embodiment, a source 14 of electromagnetic energy, generally a laser array, provides a beam 16 which passes through plane polarizing element 18 before striking storage medium 10. Substrate 12 is reflective to the beam 16 and the beam will be reflected from the substrate 12 through an analyzer 30 before striking detector 32. As was the case in FIG. 2, an intensity control circuit 40 is provided for varying the amplitude of beam 16.

Operation of the apparatus of FIG. 3 is the same as that for FIGS. 1 and 2. The only difference is that beam 16 is reflected from substrate 12 after passing through film 10, rather than being transmitted through substrate 12 before striking detector 32. This type of readout utilizes the Kerr effect and provides information in a manner entirely analogous to that when light beam 16 passes through substrate 12.

FIG. 4

FIG. 4 shows a light modulator in which a laser 70 produces a beam of light which travels to polarizing element 72 before striking amorphous magnetic material 74. Located adjacent film 74 is a electromagnetic 26. The direction of magnetization in sheet 74 can be changed by the magnetic field provided by the electromagnet 26. The degree of polarization of the light passing through amorphous sheet 74 depends on the sign and magnitude of the magnetization of sheet 74. The light intensity passing through analyzer 82 is determined by the state of polarization of the light passing through amorphous sheet 74. After passage through amorphous sheet 74, the light beam strikes analyzer 82 before being detected by photocell 84.

Depending upon the presence or absence of a domain where the light beam strikes amorphous sheet 74, the polarization of the light beam will be rotated differently. For one rotation of the polarization and light beam will be able to pass through analyzer 82 and strike photocell 84, thereby producing a current through resistor R. In the other case, the rotation of polarization of the light beam will be such that it will not pass through analyzer 82 and no voltage will be detected across resistor R. Thus, a light intensity modulator is provided by a suitable sheet of amorphous magnetic material having domains therein.

In FIG. 4, it should be understood that the light can be made to reflect from amorphous sheet 74 rather than propagating through it. In either case, the effect is the same; that is, the light will have its polarization affected differently depending upon the direction of magnetization of the domains at the location of incidence of the light beam.

RECORDING SUBSYSTEMS

It is possible to deposit the present amorphous magnetic material as a recording material onto a substrate, such as a semiconductor, insulator, or metal. The substrate can be tapes or discs. Additionally, this amorphous magnetic material can be prepared as magnetic particles in a binder (such as a conventional resin-type binder) to be used on any type of substrate.

Figure 5:
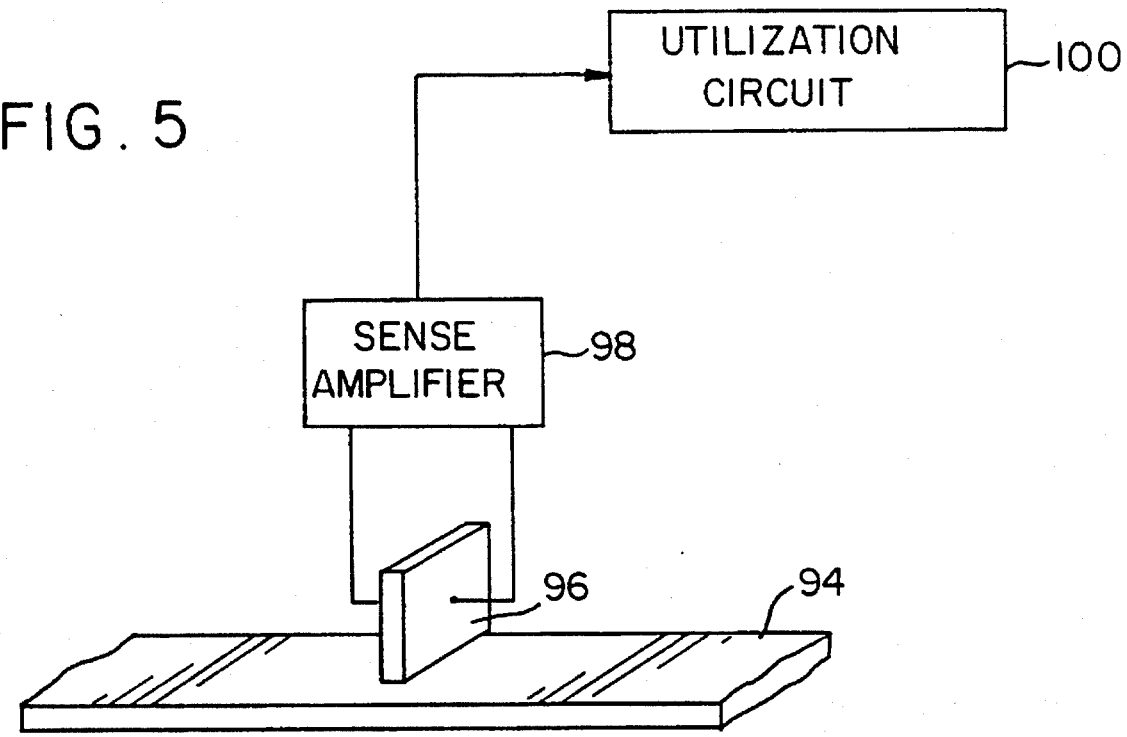
FIG. 5 is an illustration of a tape or disc information-handling system using the amorphous magnetic material of the present invention as recording medium.

FIG. 5 shows a tape or disk recording medium 94 comprising amorphous magnetic film in accordance with the present invention, over which is located a read-write head 96. Read-write head 96 is used to record information into magnetic domains in tape or disk 94 and to read the information stored therein, in a known manner. For this purpose, the electrical signals read from recording medium 94 are sent to sense amplifier 98 and then to utilization circuit 100, which could be any type of circuitry as is used in conventional computer technology.

The use of an amorphous film in accordance with FIG. 5 provides many advantages. The disk or tape substrates can be either flexible or rigid. This leads to utility in any type of information handling system. Additionally, the amorphous material is easily deposited on any type of substrate in a uniform manner to provide uniform magnetic properties throughout.

The following non-limiting examples are presented to further illustrate the present invention.

USb films are deposited by magnetron sputtering from U and Sb and optionally Co or Mn target targets onto rotating glass substrates at 300 K. Starting from a base pressure of $8\times10^{-5}$ mTorr, sputtering is carried out with an Ar pressure of 3 mTorr and an Ar flow of 30 sccm. The films for Faraday measurements were 800 Å thick, while those for resistivity, magnetic, and Kerr rotation measurements were 2000 Å thick. All samples were overcoated with 400 Å of $SiO_2$ to prevent oxidation. The film thickness is determined by profilometry while the film composition is determined by using both crystal deposition meters, Rutherford backscattering and inductively coupled plasma atomic emission spectroscopy. The amorphous character is checked by x-ray diffraction.

Magnetic measurements are made using a Superconducting QUantum Interference Device (SQUID) magnetometer in applied fields H of up to 40 kOe, with H both parallel and perpendicular to the plane of the film. The resistivity $\rho$ and Hall resistivity $\rho_H$ are obtained using the van der Pauw technique in a field of 17 kOe with the field applied perpendicular to the plane of the film. From the values of $\rho$ and $\rho_H$ the Hall angle is calculated using $\Theta_H=\arctan(\rho_H/\rho)$. Positive values of $\Theta_H$ are determined for all of the U-Sb compositions measured. The Faraday $\Theta_F$ and magneto-optic Kerr $\Theta_K$ rotations are measured using an Oxford optical dewar in magnetic fields of up to 40 kOe with the field applied perpendicular to the plane of the film. In order to permit sufficient transmission of light for Faraday effect measurements, the films are less than 800 Å thick. The energy dependences for both $\Theta_F$ and $\Theta_K$ are measured at energies E ranging from 1.55 eV to 2.76 eV at H=±40 kOe, while the temperature and magnetic field dependences are measured at E=2.25 eV (wavelength of 500 nm). Positive values of $\Theta_F$ and negative values of $\Theta_K$ are determined for all of the U-Sb compositions measured.

Results for various alloys are presented in Table I below:

TABLE 1

| Alloy $U_xSb_{1-x}$ (x) | | d gms cm$^3$ | $T_c$ (K) | $\mu_B$ Per U | $M_\parallel$ +e,fra emu+eo cm$^3$ | $M_\perp$ +e,fra emu+ee cm$^3$ | $\rho$ $\mu\Omega$cm | $\rho_H$ $\mu\Omega$cm | $\Theta_H$ deg | $\Theta_F$ deg 10$^6$ | 73$_k$ deg |
|---|---|---|---|---|---|---|---|---|---|---|---|
| .36 | | 10.0 | .90 | .7 | 84 | 127 | 558 | 40 | 4 | — | — |
| .40 | | 10.6 | 135 | 1.4 | 190 | 127 | 535 | 167 | 17 | 1.4 | 1.5 |
| .53 | | 12.0 | 140 | 1.0 | 190 | 117 | 337 | 78 | 13 | 2.1 | 3.2 |
| .63 | | 13.3 | 120 | .8 | 176 | 135 | 280 | 53 | 10 | 0.9 | 1.0 |
| .47 | .1 Co | | 100 | | 105 | | 300 | 53 | 10 | — | 2.1 |
| .43 | .2 Co | | 75 | | 70 | | 344 | 70 | 11 | — | 1.4 |
| .49 | .1 Mn | | 120 | | 240 | | 450 | 134 | 17 | — | 2.6 |
| .38 | .2 Mn | | 140 | | 110 | 150 | 283 | 87 | 13 | — | 2.2 |
| .20 | | | 100 | | | | 134 | 0.4 | 1.7 | | |

Magneto-optic data for the about 48:52 alloy are shown in FIGS. 6–9.

Figure 8:
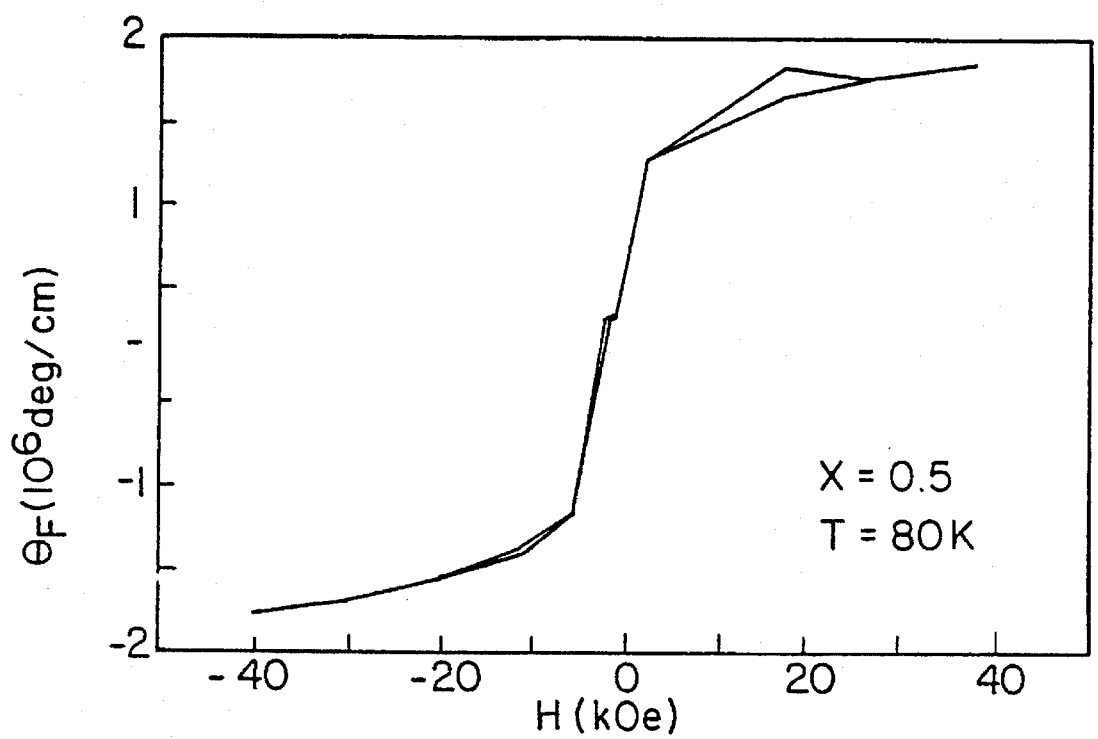
FIGS. 8 and 9 illustrate Faraday loop hysteresis at different temperatures.
Figure 9:
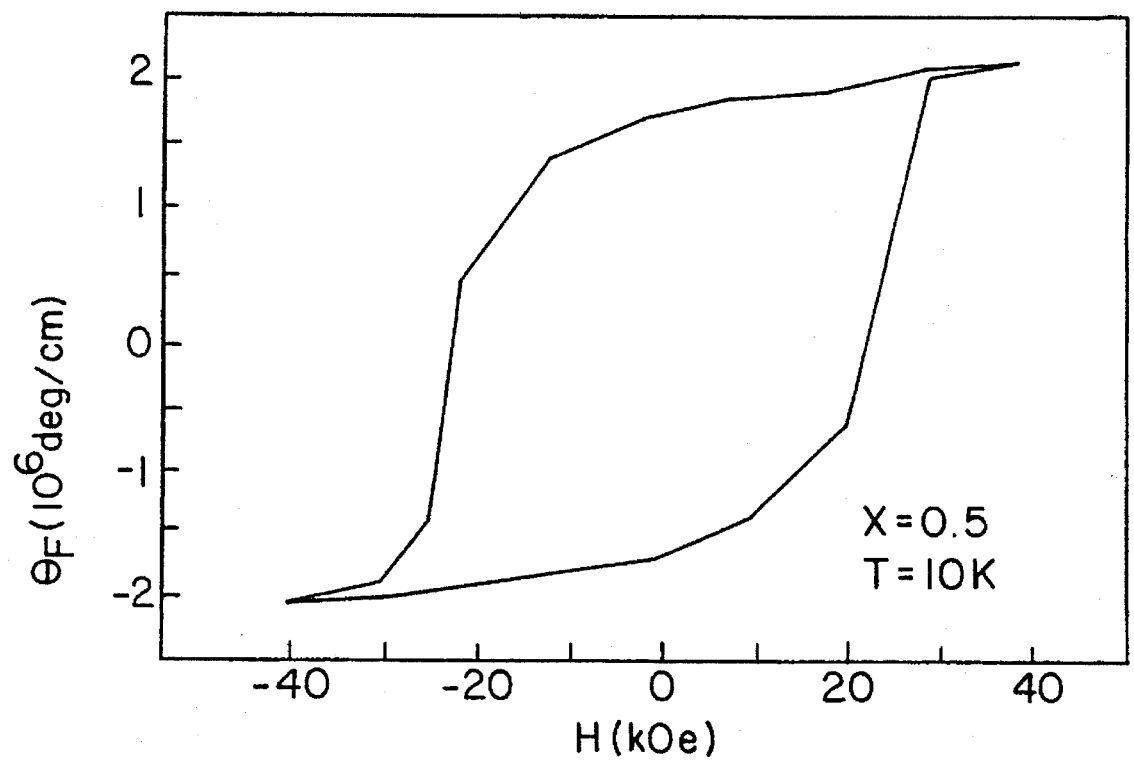

FIG. 6 shows the energy dependence of the Faraday rotation at 10 K. This date is obtained by averaging data taken at +40 and –40 kOe. Note that the rotation at 1.8 eV is over $2.2\times10^6$ deg/cm. FIG. 7 shows similar data taken at 100 K. The rotation is over $1.5\times10^6$ deg/cm in most of the wavelength range studied. A Faraday loop from –40 to +40 kOe at 80 K is shown in FIG. 8 Technical saturation occurs at 5 kOe but full saturation appears to be above 40 kOe. This type of high field susceptibility is characteristic of materials with a large random anisotropy. The more U rich alloys have even higher susceptibility in the high field region. The loop at 10 K, FIG. 9 shows an enormous coercive field of 23 kOe. The remanent rotation is about 81% of the value at 40 kOe. The 60:40 alloys shows a much less square loop at 10 K. The 40:60 alloys at 80 K, on the other hand, has a higher remanent rotation (15%) than the 48:52 alloy (about 2%, see FIG. 8).

Figure 10:
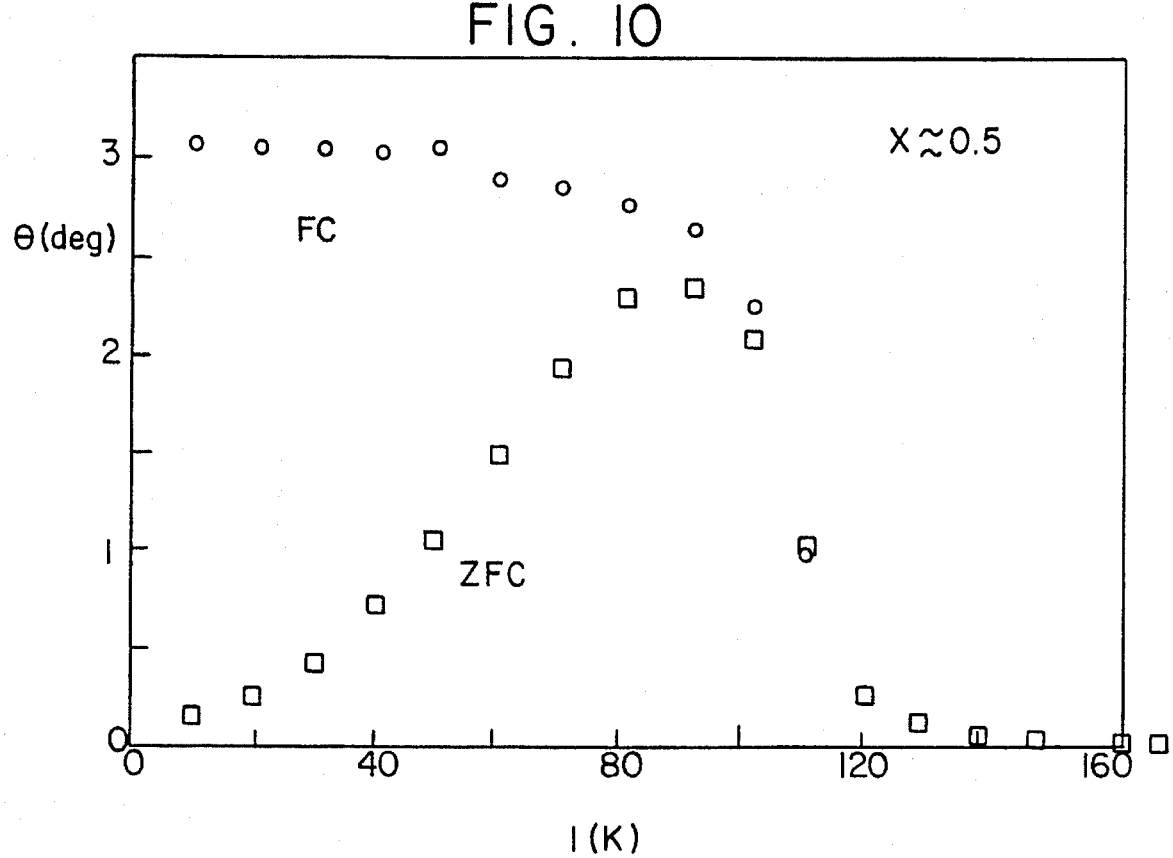
FIG. 10 illustrates the temperature dependence of the Faraday rotation at a field of 1000 Oe.

Shown in FIG. 10 are plots of $\Theta$ at 1 kOe for a 800 Å thick film of $U_{0.51}Sb_{0.49}$ which illustrates the differences observed when measurements are made by first cooling the sample in zero field and then applying a field (ZFC) rather than cooling the sample in an applied magnetic field (FC). For ZFC samples M(T) increases monotonically on warming. The Hall resistivity $\rho_H(T)$ shows a temperature dependence similar to that of M(T). In Table 1 above values of the magnetization measured with the field both parallel to the plane M can be found. For temperature dependent measurements of resistivity $\rho(T)$ from 4 K to 300 K, $\rho(T)$ is found to be nearly temperature independent ranging monotonically from 135 $\mu\Omega$cm for $U_{0.8}Sb_{0.2}$ to 558 $\mu\Omega$cm for $U_{0.3}Sb_{0.7}$.

Figure 12:
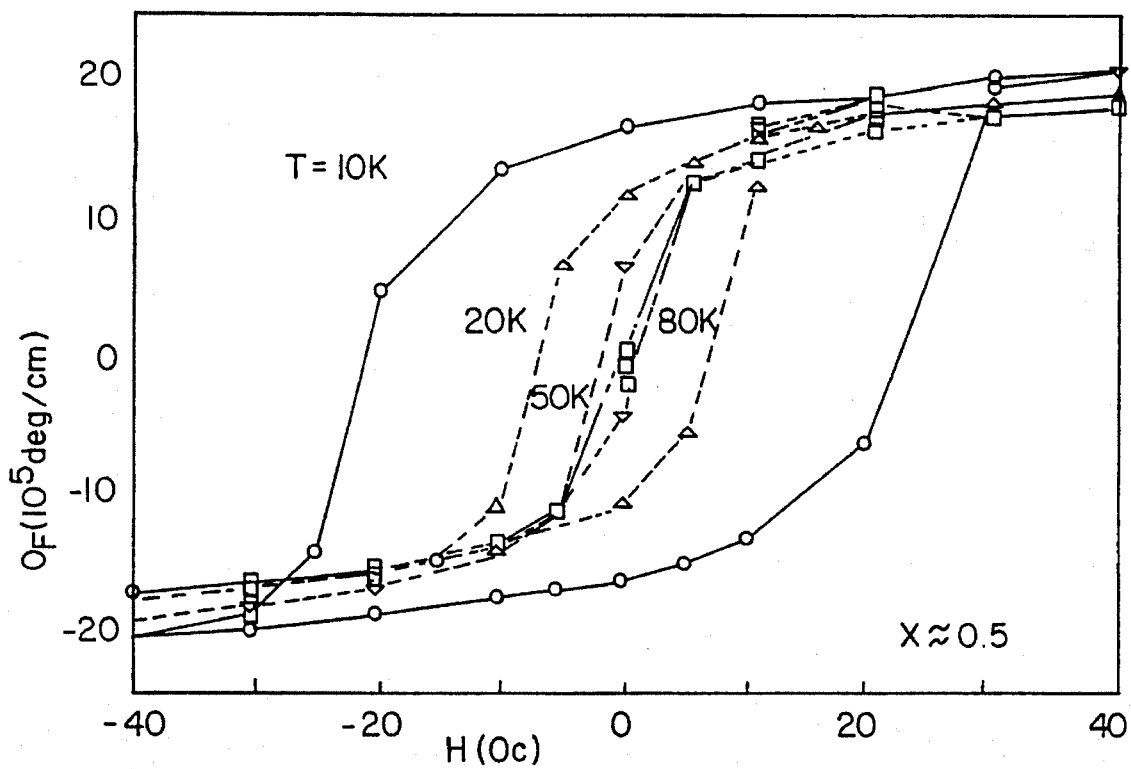
FIG. 12 illustrates magnetic field dependence H of $\Theta_F$ for the composition $U_{0.48}Sb_{0.52}$ at temperatures of 10 K., 20 K., 50 K., and 80 K.
Figure 11A:
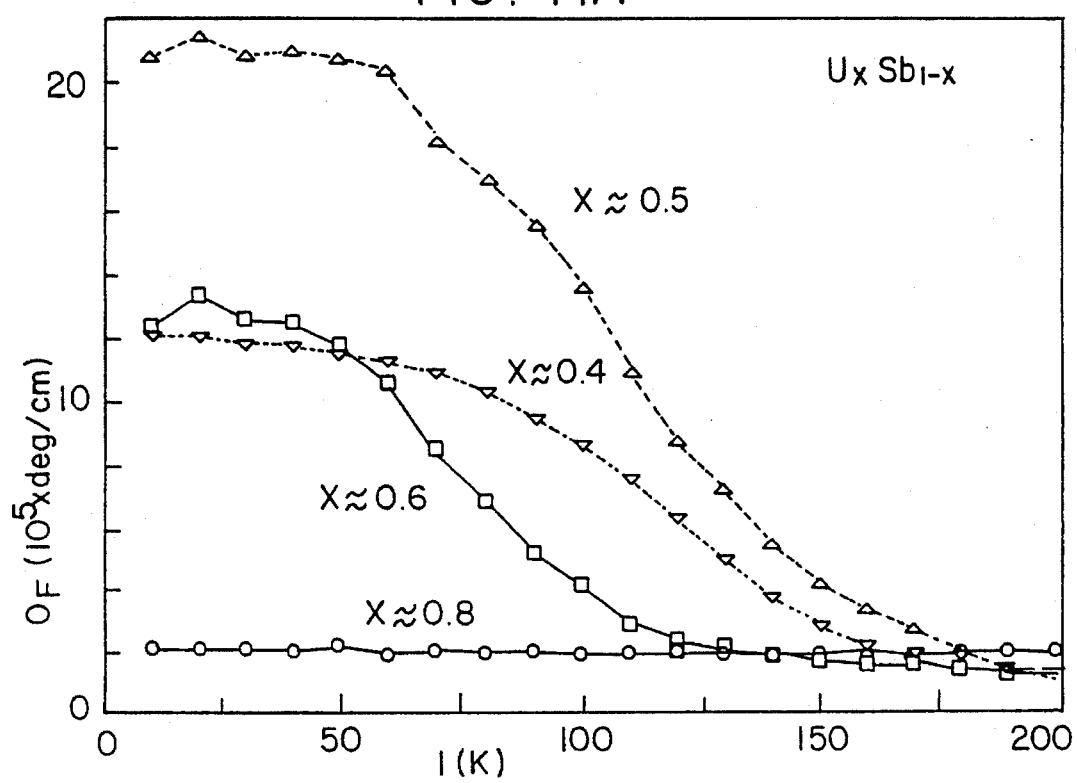
FIGS. 11A and 11B illustrate temperature dependences of A) the Faraday rotation $\Theta_F$ for the four compositions measured, and B) the Kerr rotation $\Theta_K$ for the five compositions measured.

Measurements of the specific Faraday rotation $\Theta_F$ (deg/cm) are made as a function of temperature for 10 K≤T≤200 K and H=±40 kOe. Shown in FIG. 11a are plots of the temperature dependence the average of the difference of rotation in positive and negative fields, converted to specific Faraday rotation $\Theta_F$ displaying essentially the same behavior as that observed in the magnetization. All of the systems except $U_{0.48}Sb_{0.52}$ exhibit a high temperature tail which is generally attributed to fluctuations or magnetic short range order. The values of $\Theta_F$ at H=40 kOe and T=10 K are seen to range from $0.3\times10^6$ deg/cm for $U_{0.85}Sb_{0.15}$ to $2.2\times10^6$ deg/cm for $U_{0.48}Sb_{0.52}$. Shown in FIG. 12 are plots of $\Theta_F$ as a function of field for H between +40 kOe and −40 kOe at temperatures of 10 K, 25 K, 50 K and 80 K. Significant coercivities, $H_c$ results, and the coercivities are consistent with behavior that has been observed in other amorphous metallic systems like $TbFe_2$, where the large $H_c$ has been attributed to the presence of single-ion anisotropy.

Figure 11B:
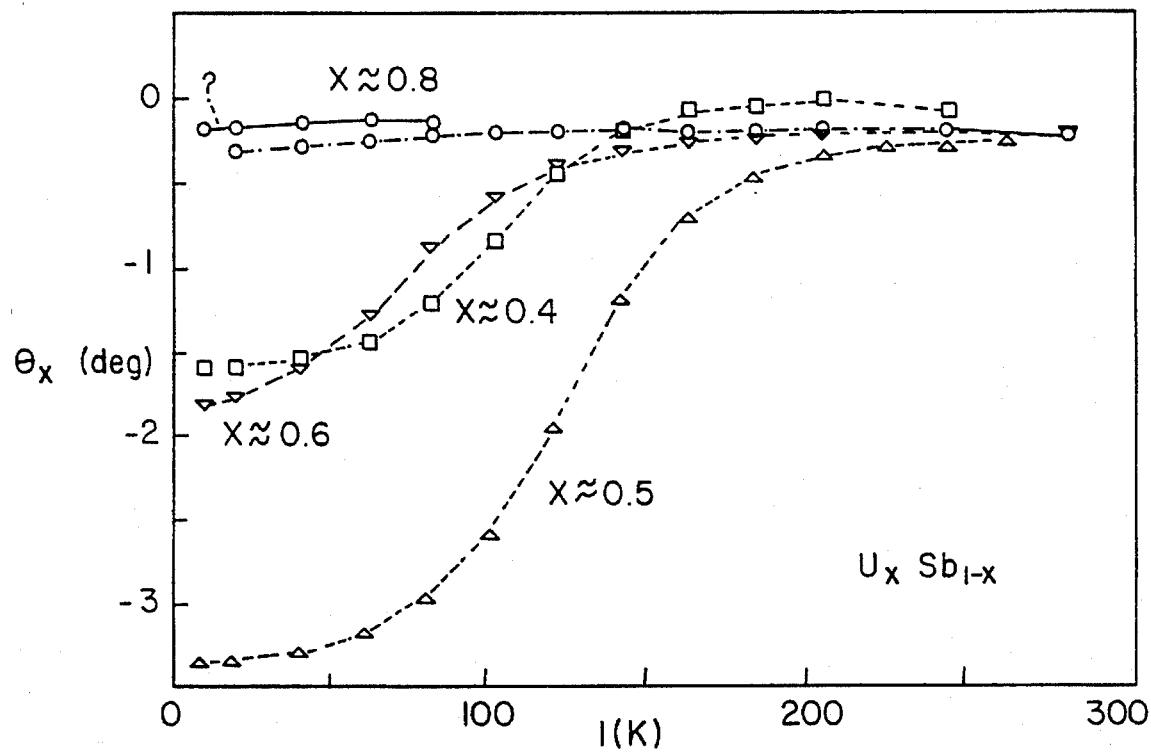

Measurements of the Kerr rotation $\Theta_K$ are made as a function of temperature for $10\ K \leq T \leq 200\ K$ and $H=\pm 40$ kOe. Shown in FIG. 11b are plots of the temperature dependence as the average of the difference of rotation in positive and negative fields. In all five systems the temperature dependence of $\Theta_K$ displays essentially the same behavior as that observed in both M(T) and $\Theta_F(T)$. The values of $\Theta_K$ at H=40 kOe and T=10 K are seen to range between −0.25 deg for $U_{0.15}Sb_{0.85}$ to −3.2 deg for $U_{0.51}Sb_{0.49}$.

Figure 13A:
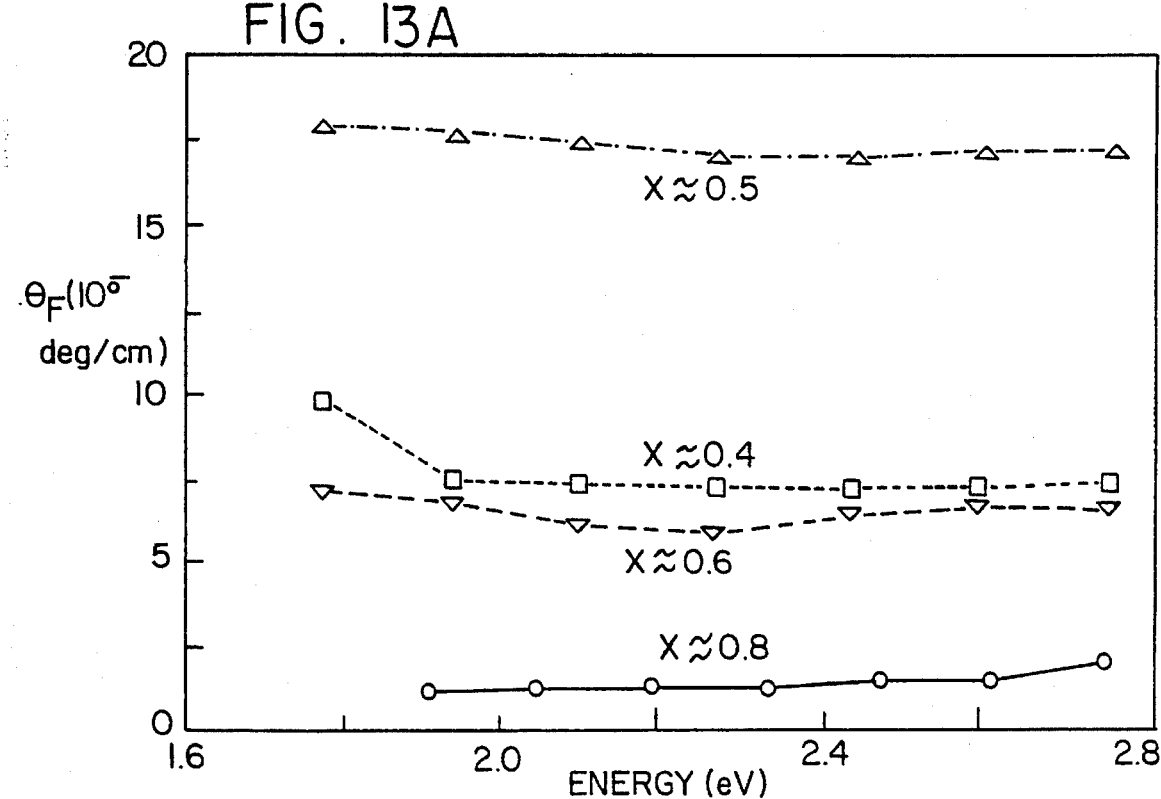
FIGS. 13A and 13B illustrate energy dependences of A) $\Theta_F$ for four compositions and B) $\Theta_K$ for four compositions.
Figure 13B:
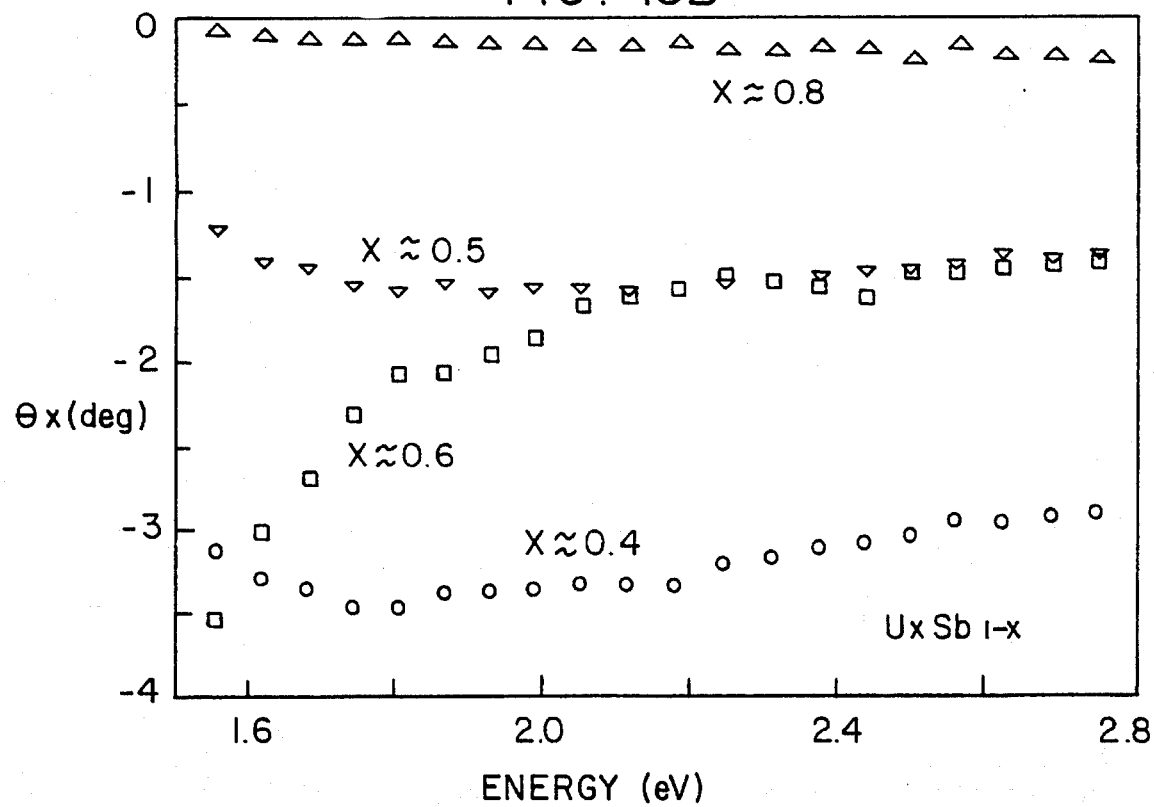

The energy dependence of $\Theta_F$ at various compositions is plotted in FIG. 13a for E, photon energy, between 1.77 eV and 2.76 eV. A similar plot for $\Theta_K$ is shown in FIG. 13b for E between 1.55 eV and 2.76 eV. In both cases there is little evidence of dispersion and remarkably little change in the spectra with composition. In addition, there is essentially no change in dispersion as a function of temperature for either $\Theta_F$ or $\Theta_K$.

What is claimed is:

1. A magnetic system comprising:
   a magnetic medium comprising an amorphous alloy exhibiting magneto-optical rotation and containing uranium and a member selected from the group consisting of N, P, As, Sb, Bi, S, Se, Te, Po and mixtures thereof wherein the atomic ratio of the uranium to said member is from about 60:40 to about 20:80, and wherein said alloy further includes about 5 to 40 atomic % of Mn, Co or both;
   and wherein said magnetic medium exhibits a square loop hysteresis curve, a Tc of at least about 70° K, and is responsive to light in the visible wavelengths; and has a Faraday rotation of at least about $0.9\times10^6$ deg/cm or a magneto-optic Kerr rotation of at least 1 degree; magnetization of at least about 100 emu/cm$^3$; Hc of at least about 5 kOe; Hall angle of at least about 4 degrees; and resistivity value of at least about 200 micro ohm-cm;
   writing means for changing the magnetic state of said magnetic medium;
   said writing means being comprised of beam generating means for directing electromagnetic energy at said magnetic medium and magnetic field producing means for providing a magnetic field in said magnetic medium; and
   reading means for detecting the magnetic state of said magnetic mediums.

2. The magnetic system of claim 1 wherein said member is selected from the group consisting of As, Sb, Bi, Se, Te, Po and mixtures thereof.

3. The magnetic system of claim 1 wherein said member is Sb.

4. The system of claim 1 where said beam is a light beam.

5. The system of claim 1 where said beam is an electron beam.

6. The system of claim 1 where said beam has sufficient energy to heat said magnetic medium to a temperature substantially close to its magnetic compensation point.

7. The system of claim 1 where said beam generating means includes a light source for providing a polarized light beam and said reading means includes an analyzer set to pass said light in accordance with the polarization of said beam as determined by said magnetic medium, and a detector responsive to the intensity of light reaching it after passage through said analyzer.

8. The magnetic system of claim 1 wherein the ratio of uranium to said member is from about 60:40 to about 40:60.

9. A beam addressable system comprising:
   a magnetic layer located on a substrate wherein said magnetic layer exhibiting magneto-optical rotation and contains an amorphous alloy comprising uranium and a member selected from the group consisting of N, P, As, Sb, Bi, S, Se, Te, Po and mixtures thereof;
   wherein the atomic ratio of uranium to said member is from about 60:40 to about 20:80; and wherein said alloy further includes about 5 to 40 atomic % of Mn, Co or both;
   and wherein said magnetic medium exhibits a square loop hysteresis curve, a Tc of at least about 70° K, and is responsive to light in the visible wavelengths; and has a Faraday rotation of at least about $0.9\times10^6$ deg/cm or a magneto-optic Kerr rotation of at least 1 degree; magnetization of at least about 100 emu/cm$^3$, Hc of at least about kOe; Hall angle of at least about 4 degrees; and resistivity value of at least about 200 micro ohm-cm;
   beam producing means for generating a beam of electromagnetic energy directed at desired locations of said layer for heating said layer at said desired locations;
   magnetic field producing means for providing a magnetic field in said layer for changing the magnetic state of said layer at said desired locations;
   reading means for detecting a base of electromagnetic energy after it has struck said layer at said desired location for determining the magnetic state of said layer at said locations.

10. The system of claim 9 where said reading means is comprised of an analyzer for selective passage of said beam used for reading in accordance with its polarization state, and a detector for providing a signal in accordance with the intensity of said beam which strikes said detector after passage through said analyzer.

11. The system of claim 9 wherein said substrate is rigid.

12. The system of claim 9 wherein the ratio of uranium to said member is from about 60:40 to about 40:60.

13. A magnetic storage system comprising:
   a storage medium located on a substrate, said storage medium being a magnetic material comprising an amorphous alloy exhibiting magneto-optical rotation and containing uranium and a member selected from the group consisting of N, P, As, Sb, Bi, S, Se, Te, Po and mixtures thereof;
   wherein the atomic ratio of uranium to said member is from about 60:40 to about 40:60; and wherein said alloy further includes about 5 to 40 atomic % of Mn, Co or both;
   and wherein said magnetic medium exhibits a square loop hysteresis curve, a Tc of at least about 70° K, and is responsive to light in the visible wavelengths; and exhibits a Faraday rotation of at least about $0.9 \times 10^6$ deg/cm or a magneto-optic Kerr rotation of at least 1 degree; magnetization of at least about 100 emu/cm$^3$, Hc of at least about 5 kOe; Hall angle of at least about 4 degrees; and resistivity value of at least about 200 micro ohm-cm;

writing means for changing the magnetic state of a plurality of selected portions of said storage medium, said writing means including:

heating means for locally heating selected areas of said storage medium;

magnetic field producing means for providing a magnetic field at said selected areas for altering the magnetic state of said storage medium at said selected areas;

reading means for detecting the magnetic state of said selected areas of said storage medium, said reading means including:

light means for directing a polarized light beam onto said selected areas of said storage medium to cause polarization rotation of said light beam in accordance with the magnetic state of said storage medium at said selected areas, and detection means responsive to the degree of rotation of said light beam polarization.

14. The system of claim 13 where said heating means is comprised of a beam producing means for directing a beam of electromagnetic energy onto said storage medium.

15. The system of claim 13 where said electromagnetic beam is a light beam.

16. The system of claim 13 where said beam producing means is a laser.

17. The system of claim 13 including means for moving said storage medium.

18. The system of claim 13 where said heating means is comprised of a light source for directing a light beam onto said storage medium.

19. The system of claim 13 where said light source also provides said polarized light beam used for reading.

20. The system of claim 13 where said magnetic material is located on a conducting substrate.

21. They system of claim 13 where said magnetic material is located on an insulating substrate.

22. In a storage system comprising:

a storage medium onto which is incident an electromagnetic beam used to write a plurality of bits of information into the storage medium or to read the information associated with the bits stored in the storage film, the improvement being a magnetic storage medium containing an amorphous alloy exhibiting magneto-optical rotation and comprising uranium and a member selected frown the group consisting of N, P, As, Sb, Bi, S, Se, Te, Po and mixtures thereof;

wherein the atomic ratio of uranium to said member is from about 60:40 to about 40:60; and wherein said alloy further includes about 5 to 40 atomic % of Mn, Co or both;

and wherein said magnetic medium exhibits a square loop hysteresis curve, a Tc of at least about 70° K, and is responsive to light in the visible wavelengths; and exhibiting a Faraday rotation of at least about $0.9 \times 10^6$ deg/cm or a magneto-optic Kerr rotation of at least 1 degree; magnetization of at least about 100 emu/cm$^3$, Hc of at least about 5 kOe; Hall angle of at least about 4 degrees; and resistivity value of at least about 200 micro ohm-cm.

23. The storage medium of claim 22 wherein said member is selected from the group consisting of As, Sb, Bi, Se, Te, Po and mixtures thereof.

24. The storage medium of claim 22 wherein said member is Sb.

\* \* \* \* \*